United States Patent [19]

Alcorn

[11] Patent Number: 5,310,043
[45] Date of Patent: May 10, 1994

[54] FEED APPARATUS WITH TWO FEEDSCREWS

[75] Inventor: William J. Alcorn, Rockland, Mass.

[73] Assignee: Pneumatic Scale Corporation, Quincy, Mass.

[21] Appl. No.: 17,859

[22] Filed: Feb. 16, 1993

[51] Int. Cl.⁵ .................................. B65G 33/06
[52] U.S. Cl. ............................ 198/625; 414/798.9; 198/418.7; 198/608
[58] Field of Search ............ 198/608, 611, 625, 663, 198/467.1, 471.1, 468.4, 419.2, 418.7; 414/798.2, 798.9; 271/149, 150

[56] References Cited

U.S. PATENT DOCUMENTS

| | | | |
|---|---|---|---|
| 1,828,168 | 10/1931 | Ayars | 198/461 |
| 2,085,339 | 6/1937 | Smith | 198/625 X |
| 2,630,904 | 3/1953 | Bozek | 198/463.4 |
| 2,795,702 | 6/1957 | Morris | 198/625 X |
| 3,342,117 | 9/1967 | Cole | 198/611 X |
| 3,415,351 | 12/1968 | Ware et al. | 198/419.2 X |
| 3,791,508 | 2/1974 | Osborne et al. | 198/625 |
| 4,109,572 | 8/1978 | Roulleau | 198/625 X |
| 4,266,651 | 5/1981 | Strom | 198/611 X |
| 4,273,322 | 6/1981 | Ginther, Sr. et al. | 271/149 |
| 4,435,114 | 3/1984 | Fardin | 414/798.9 |
| 4,564,188 | 1/1986 | McNair | 414/798.9 X |
| 4,789,016 | 12/1988 | Mihail | 198/464.1 X |
| 4,884,795 | 12/1989 | Vander Syde | 271/149 X |
| 5,044,877 | 9/1991 | Constant et al. | 414/798.9 |
| 5,050,720 | 9/1991 | Crankshaw | 198/467.1 |
| 5,050,725 | 9/1991 | Newell et al. | 198/444 |
| 5,105,931 | 4/1992 | Lashyro | 198/471.1 |
| 5,107,980 | 4/1992 | Piazza | 198/676 |
| 5,161,791 | 11/1992 | Akiyama et al. | 414/798.9 X |

Primary Examiner—James R. Bidwell
Attorney, Agent, or Firm—Robert M. Asher

[57] ABSTRACT

A feed apparatus including two feedscrews for supporting flat articles as they are moved along a conveyor. The two feedscrews are mounted in parallel and are spaced apart so that each feedscrew supports the flat articles along a different edge of the articles. The flat articles are maintained in a substantially vertical alignment throughout the conveyance. A suction pickoff station removes the flat articles one at a time from the downstream end of the feed apparatus. The two feedscrews turn at equal speeds and have equal pitches which separate the flat articles into groups between consecutive projections of the helical threads of the feedscrews.

25 Claims, 2 Drawing Sheets

FEED APPARATUS WITH TWO FEEDSCREWS

BACKGROUND OF THE INVENTION

The present invention is directed to an automatic feed apparatus for transporting articles, particularly flat articles such as cartons, to a one-at-a-time pickoff station.

In a continuous production process for filling and sealing boxes with particulate matter, such as laundry soap, the beginning of the process is to load the cartons to be filled onto the automated apparatus. The cartons come boxed with the cartons being collapsed and flat against each other. The boxes of flattened cartons are opened and emptied onto a conveyor belt. The flattened cartons stand against each other on edge. The cartons must be moved along to a station where they can be removed one at a time for further processing such as opening, filling and sealing. Moving the cartons along in an upright position to the removed station has been complicated by the inclusion of handles attached to the cartons. The handles interfere with flat carton against carton surface contact that was possible without the handles. The slack in the line of cartons that necessarily develops between cartons with handles tends to make it more likely that the cartons will be flopped over when they arrive at the removal station.

It is an object of the present invention to provide a feed apparatus that will deliver flat articles such as cartons in a substantially upright position to permit easier and consistent removal.

SUMMARY OF THE INVENTION

The present invention is directed to a feed apparatus having two parallel feedscrews. The first feedscrew is positioned alongside a conveyor while the second feedscrew is mounted at a different vertical height from the conveyor. The threads of the two feedscrews project between adjacent flat articles on the conveyor. The two feedscrews are located along different edges of the flat articles in the line. The pitch of the threads on the feedscrews are such that a plurality of the flat articles being transported fit between consecutive insertions of the helical thread. Thus, the flat articles are transported in groups between the insertions of the feedscrews threads. The flat articles lined up on their edge on a conveyor are moved between the feedscrews towards a pickoff station. The conventional suction cup pickoff device works well with the feedscrew apparatus since the use of the two feedscrews advantageously maintains the flat articles in a substantially vertical position all the way up until they are picked off.

The feedscrews may be advantageously mounted on adjustable arms so that the position of the feedscrews may be changed to accommodate the feeding of articles of different sizes. The drive apparatus turns the two feedscrews at equal speeds. The rotational speed of the feedscrews is a function of the speed of the conveyor so that the two are in proper relation. The feed apparatus of the present invention advantageously maintains flat articles in a substantially vertical position for pickoff by a suction cup device even when handles or the like are riveted to the flat articles. Other objects and advantages of the invention will become apparent during the following description of the presently preferred embodiment of the invention taken in conjunction with the drawings.

DETAILED DESCRIPTION OF THE PREFERRED EMBODIMENT

Figure 1:
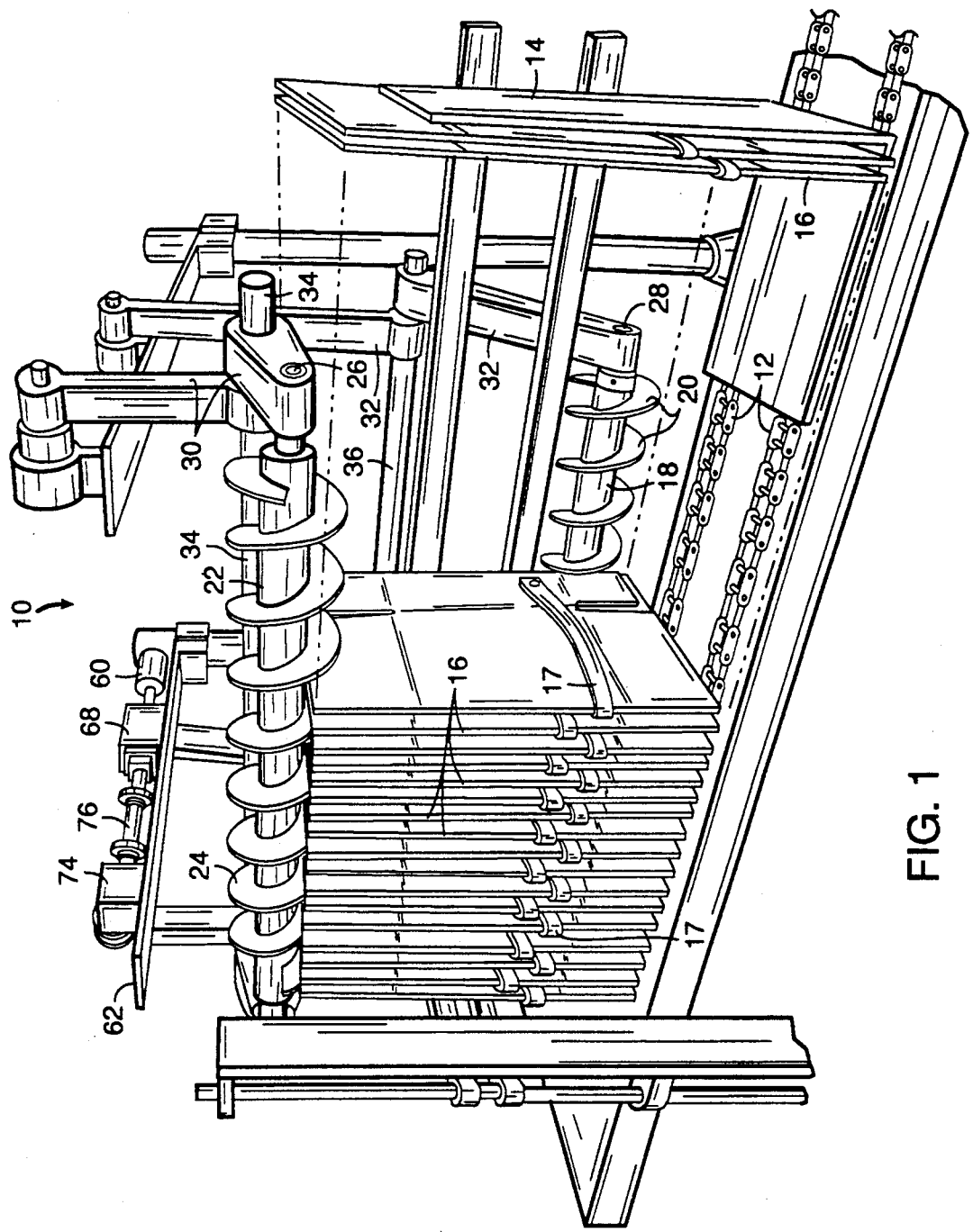
FIG. 1 is a perspective view of the feed apparatus of the present invention.

Referring now to the drawings, a feed apparatus 10 of the present invention is shown. The feed apparatus 10 is shown here transporting cartons 16 with plastic handles 17 riveted thereto. While the feed apparatus 10 of the present invention may be used for conveying any number of types of articles, it is especially adapted for the conveyance of substantially flat articles such as the handle bearing cartons shown in the drawings. A conveyor 12 is provided for moving the articles in a linear direction. The conveyor 12 shown in the drawings is a chain or pair of chains. The pair of chains are driven at the same speed by the same drive. Any alternative conveyor may be used for the chain such as a conveyor belt or other mechanism for providing a moving surface for the bottom edges of the flat articles. A restraining stand 14 is provided that may be demountably attached to the conveyor chain 12. The restraining stand 14 supports the upstream flat articles in a vertical position as they are moved along on the conveyor 12. The articles are placed flat against each other in a horizontal line with their edges on the conveyor 12. Only some of the cartons are shown in FIG. 1 others have been left out of the drawing to provide an improved view of the feed apparatus itself. The horizontal line of flat articles provides an intense line pressure which the feedscrews are designed to restrain so that the upstream cartons do not fall over.

Two feedscrews are provided in parallel along the conveyor 12 to support the flat articles in a substantially vertical position and to maintain them in an upright position against the force of the line pressure. A first feedscrew 18 is mounted longitudinally in the direction of the conveyor movement. The first feedscrew 18 is alongside the conveyor and at least partially higher than the conveyor so that its threads 20 can insert between adjacent cartons 16. Looking from the upstream end of the conveyor the first feedscrew 18 in FIG. 1 has its threads inserted into or along a right hand edge of the cartons 16. The helical thread 20 of the first feedscrew 18 is pitched at an angle such that a group of several cartons 16 fit between consecutive insertions of the thread 20. The presently preferred pitch angle of the helical thread is 59.04 degrees. The presently preferred dimensions for the feedscrew are 60 inches in length, 5 inches outer diameter and 2 inches for the root diameter. The feedscrew is preferably made of steel, but any sufficiently smooth and durable material such as DELRIN plastic may be used.

A second feedscrew 22 is mounted longitudinally parallel to the first feedscrew 18. The second feedscrew 22 is mounted at a different vertical height from the conveyor 12 than is the first feedscrew 18. In order to adequately support the flat articles in a substantially vertical position, the second feedscrew 22 is provided such that its threads 24 are inserted along a different edge of the cartons from the edge supported by the first feedscrew 18. Thus, in the drawings, the threads of the second feedscrew 22 insert along the top edge of the cartons 16. The feedscrew 22 is shown at the upper left hand corner of the cartons opposite to the lower right hand corner where the first feedscrew 18 is roughly located. It is preferred that while the first feedscrew is to one side of an imaginary center line through the conveyor 12, that the second feedscrew be mounted, so as to be centered on the opposite side of the imaginary center line. The second feedscrew 22 has the identical pitch to the first feedscrew 18 and rotates at the same speed as the first feedscrew 18. Indeed, it is desirable that the feedscrews are arranged identically so that their threads insert between the same adjacent flat articles and so that the same groups are carried between the consecutive threads of both feedscrews.

In accordance with the presently preferred embodiment, the upstream ends of the feed screws are mounted in hubs 26, 28 that are idle. The drive mechanism is more conveniently located at the downstream end. The hubs 26 and 28 may be supported on adjustable arms 30 and 32, respectively. The adjustments on the arms 30 and 32 may be simple mechanical manual adjustments or, alternatively, a robotic arm may be used with electronic control over positioning. The upstream arms 30 and 32 are preferably connected to the downstream arms by crossbars 34 and 36 to help keep the rear hub and downstream hub in alignment for proper mounting of the feedscrews.

Figure 2:
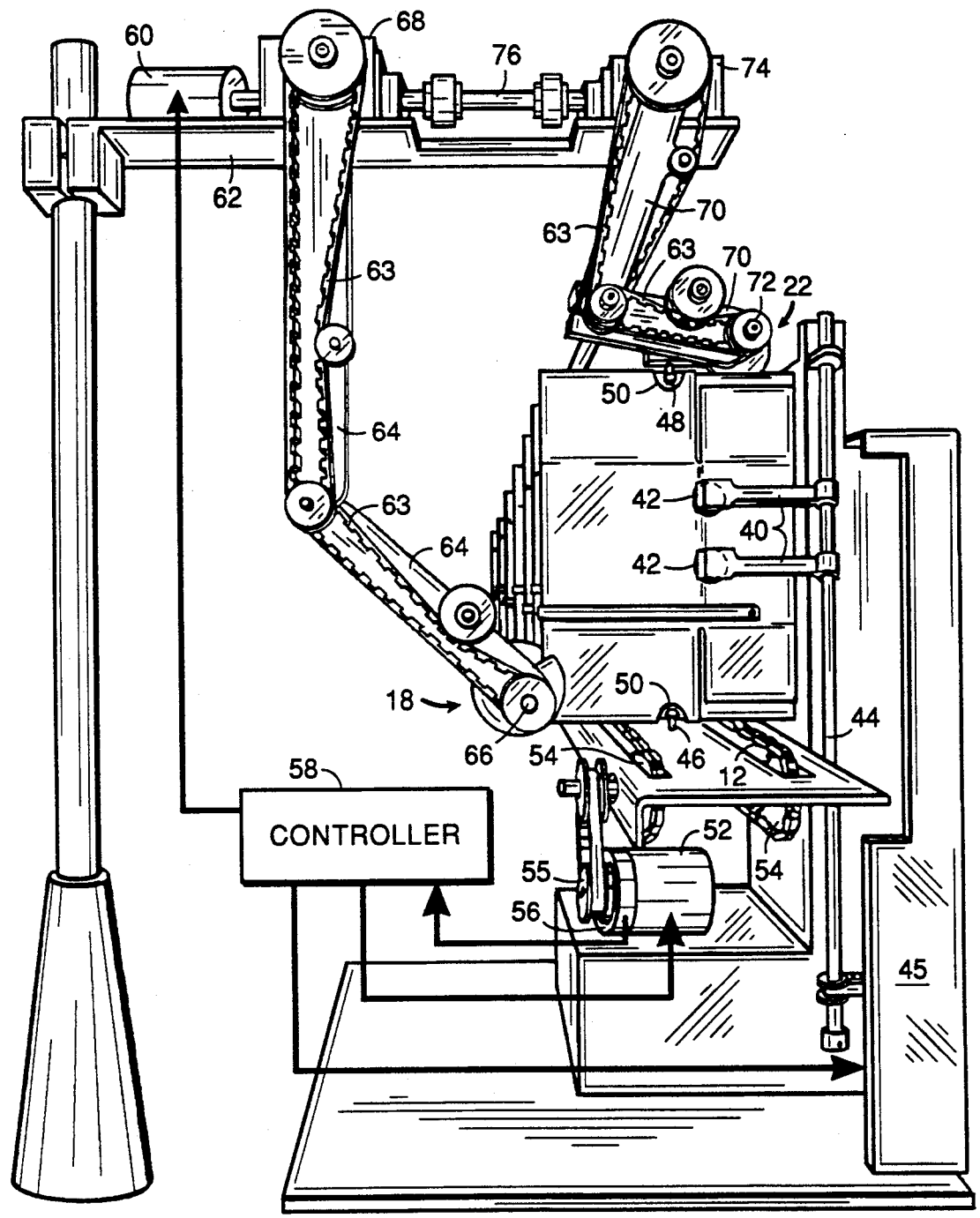
FIG. 2 is a downstream end view of the feed apparatus of FIG. 1.

Referring now to FIG. 2, the drive mechanisms and pickoff station can be more easily seen. The pickoff station at the downstream end of the conveyor includes two swinging arms 40 each with a suction cup 42 mounted on its outer end. The suction cups 42 are provided for suction engagement with a substantially vertical flat surface of the lead article on the conveyor. A pickoff shaft 44 driven by pickoff drive 45 cyclically rotates the swinging arms 40 into contact with the lead flat article and away from the conveyor. The removed article is then handed off to the next apparatus in the processing system. In the case of detergent cartons, the procedures of opening the carton, filling the carton, and sealing the carton follow. The presently preferred invention is designed to operate at speeds of from 40 to 100 cartons per minute. Thus, the swinging arms 44 rotate back and froth 40 to 100 times per minute picking off the lead flat articles as they arrive from the conveyor.

Since the flat articles are arriving in groups at the downstream end, it is useful to provide some additional means to hold the articles in their substantially vertical position while awaiting the pickoff. Thus, it is recommended that a lower pin 46 and an upper pin 48 project slightly into the path of the flat articles to hold them up momentarily while the lead flat article is being removed to the next machine. So that the pins 46 and 48 do not interfere with the pickoff process, it is desirable that a notch 50 be cut out at the bottom and top portion of the lead flaps in the carton. Thus, as the pickoff means pulls a carton out from behind the pins the rear flaps on the carton easily bend backwards as they brush over the pins. The forward flap on the carton will not hit the pins because of the notches. Motor 52 turns at a constant desired speed. A sprocket 55 is rotated by the motor 52. A positive drive belt from the sprocket 55 turns gears 54 at the desired speed for moving the conveyor chains 12 at a constant linear speed. A tachometer 56 is mounted between the sprocket 55 and the motor 52 for measuring the speed at which the sprocket 55 is rotating. A signal corresponding to the speed of the sprocket and hence determinative of the linear speed of the conveyor is directed to a controller 58. The controller 58 is used to set the speeds of the conveyor 12, the pickoff shaft 44 and the feedscrews. The speed of the feedscrews and the pickoff shaft are determined as a function of the linear speed of the conveyor to coordinate the system components. The linear speed of the conveyor should equal the linear speed of feed screw thread. Thus, the supporting threads move along with the cartons at the same speed as the conveyor. The speed of the pickoff shaft is based on the linear speed of the conveyor and the numb of cartons per inch. This determines the number of cartons per minute.

The rotational speed of the feedscrews needs to be a function of the speed of the conveyor. This can be accomplished electronically with the tachometer 56 and the controller 58. Alternatively, the speeds can be coupled mechanically. Gears, drive shafts and drive belts may be used to link the rotation of the feedscrews to the same motor used to drive the conveyor chains. Either mechanical or electrical coupling may be used to equivolently accomplish the proper relationship between conveyor speed and feedscrew rotational speed required.

In accordance with electronic coupling, a separate feedscrew motor 60 is mounted on a horizontal beam 62 at the downstream end of the conveyor system. The controller 58 electronically sets the speed of the feedscrew motor 60. The feedscrew motor 60 drives a gear box 68.

Positive drive timing belts 63 are used to deliver the rotational motion from the gear box 68 to the feedscrews. The positively engaged timing belts 63 ma be replaced by chains and gears or other drive means for turning the feedscrews.

An adjustable arm 64 supports a hub 66 on which the first feedscrew is mounted. At the base of the arm 64 is a gear box 68 for providing the rotational motion to the first feedscrew 18. A second arm 70 is mounted for supporting a hub 72 in which the second feedscrew 22 is mounted. A gear box 74 is mounted at the base of the second adjustable arm 70. The gear boxes 68 and 74 are connected by a drive shaft 76. The drives of the feedscrews 18 and 22 are coupled through to the feedscrew motor 60. The first feedscrew 18 and the second feedscrew 22 are both turned at the same speed so that the same groups of flat articles are moved along the conveyor at the same speed and are equally supported through their conveyance until they reach the downstream end of the feed apparatus.

The downstream adjustable arms 64 and 70 are connected by crossbars 34 and 36 to the upstream adjustable arms so that the hubs that they support are maintained in alignment. As with the upstream arms, the downstream arms may be provided with manual mechanical adjustments for changing the location of the feedscrew or an electronic robotic linkage may be provided for automatic location adjustments. The adjustable arms provide freedom of movement in two dimensions relative to the conveyor so that the feedscrews can be arranged to best support the flat articles so that they do not flop over. It is recommended that the two feedscrews each be positioned for insertion into a different edge of the flat articles. In FIG. 2, feedscrew 18 is inserted along the left hand edge while feedscrew 22 is inserted along the top edge.

The feeding operation shall now be described. Boxes of cartons in their collapsed state are loaded onto the conveyor belt 12. Thus, a horizontal line of flat articles 16 supported on their edge are moved by the conveyor 12. The flat sides of the flat articles face one another. The rear restraining stand 14 is repeatedly removed from the conveyor and pulled back so that additional boxes of flat cartons can be added to the conveyor. The conveyor 12 moves the flat articles toward the feedscrews 18 22. As the conveyor moves the articles between the two feedscrews the threads of the feedscrews insert between adjacent flat articles. Groups of several flat articles are conveyed between consecutive insertions of the helical threads of the feedscrews. The rotational speeds of the feedscrews are equal to one another and are coordinated so as to be functionally related to the speed of the conveyor so that the flat articles 16 are smoothly moved along between the feedscrews and upon the conveyor. The flat articles are supported in groups between consecutive insertions of the helical threads of the feedscrews. At the downstream end of the feedscrews, the pickoff apparatus removes the flat articles one at a time from the conveyor. The controller 58 sets the pickoff speed in articles per minute to correspond to the linear speed of the conveyor and the number of articles per length of conveyor. The feedscrews have advantageously maintained the articles in substantially vertical position despite the line pressure exerted against these articles as they are moved along. The articles remain vertical long enough so that the pickoff apparatus with its suction cups can attach to the vertical surface of the articles and remove them one at a time from the downstream end of the conveying apparatus.

Of course, it should be understood that various changes and modifications to the preferred embodiment described above will be apparent to those skilled in the art. For example, the feedscrews may be mechanically linked to the drive for the conveyor belt. The positions of the feedscrews can be adjusted to accommodate different size and shape articles. These and other changes can be made without departing from the spirit and scope of the invention and without diminishing its attendant advantages. It is therefore, intended that such changes and modifications be covered by the following claims.

I claim:

1. A feed apparatus comprising:
   a linearly moving conveyor for moving articles placed thereon in a linear direction;
   a first feedscrew mounted longitudinally in said linear direction alongside said conveyor and at least partially higher than said conveyor;
   a second feedscrew mounted parallel to said first feedscrew proximate to said conveyor and mounted at a different vertical height from said conveyor than said first feedscrew, said first and second feedscrews both acting to support said articles in an upright position relative to said conveyor as said articles move on said conveyor;
   feedscrew drive means for rotating said first and second feedscrews at equal speeds;
   means for driving said conveyor at a linear speed; and
   means for coupling said feedscrew drive means and said means for driving said conveyor so as to control said feedscrew drive means as a function of the linear speed of said conveyor.

2. The feed apparatus of claim 1 further comprising pickoff means positioned at a downstream end of said first and second feedscrews for removing articles from said conveyor one at a time.

3. The feed apparatus of claim 2 wherein said pickoff means comprises at least one suction cup operated so as to attach by suction to a substantially vertical surface of an article and then to remove said article from said conveyor.

4. The feed apparatus of claim 1 further comprising adjustable arms attached to said first and second feedscrews, so that said arms can reposition said feedscrews relative to said conveyor so that said feed apparatus can be used to convey articles of a different size.

5. The feed apparatus of claim 1 wherein the first feedscrew is mounted on one side of an imaginary center line through said conveyor and the second feedscrew is mounted so as to be centered on an opposite side of the imaginary center line from said first feedscrew.

6. An apparatus for feeding flat articles, each article having two flat sides, said apparatus comprising:
   conveyor means for moving the flat articles in a linear direction, the flat articles being arranged perpendicular to the linear direction so that each flat side faces the flat side of an adjacent flat article;
   a first feedscrew having a helical thread pitched at a first pitch angle, said first feedscrew being mounted longitudinally in said linear direction alongside and with its helical thread at least partially higher than said conveyor means such that the helical thread of said first feedscrew is inserted between adjacent flat articles along a first edge of the flat articles and wherein the first pitch angle of the helical thread is such that a plurality of the flat articles are supported between consecutive insertions of the thread while being moved along on said conveyor means; and
   a second feedscrew having a helical thread pitched at the first pitch angle, said second feedscrew mounted parallel to said first feedscrew and positioned such that the helical thread of said second feed screw is inserted between adjacent flat articles along a second edge of the flat articles with a plurality of the flat articles supported between consecutive insertions of the thread while being moved along on said conveyor means.

7. The feed apparatus of claim 6 further comprising pickoff means positioned at a downstream end of said first and second feedscrews for removing the flat articles from said conveyor means one at a time.

8. The feed apparatus of claim 7 wherein said pickoff means comprises at least one suction cup operated so as to attach by suction to one of the flat sides of one of the flat articles and then to remove said article from said conveyor means.

9. The feed apparatus of claim 6 further comprising adjustable arms attached to said first and second feedscrews, so that said arms can reposition said feedscrews relative to said conveyor means so that said feed apparatus can be used to convey articles of a different size.

10. The feed apparatus of claim 6 further comprising feedscrew drive means for rotating said first and second feedscrews at equal speeds.

11. The feed apparatus of claim 10 further comprising motive means for driving said conveyor means at a linear speed and means for controlling said feedscrew drive means as a function of the linear speed of said conveyor means.

12. A feed apparatus comprising:
   conveyor means for moving articles placed thereon in a linear direction;

a first pair of arms each having a hub mounted at one end thereof, said arms being coupled to one another so that said hubs are in alignment parallel to the linear direction and said arms being adjustably movable for changing the location of said aligned hubs;

a first feedscrew mounted between the hubs of said first pair of arms;

a second feedscrew mounted proximate to said conveyor means and parallel to said first feedscrew;

means for driving said conveyor means at a desired speed; and means for rotating said first and second feedscrews at equal speeds so that articles are supported by said first and second feedscrews as the articles move on said conveyor means.

13. The feed apparatus of claim 12 further comprising a second pair of arms each having a hub at one end thereof, said arms being coupled to one another so that said hubs are in alignment parallel to the linear direction and said arms being adjustably movable for changing the location of said aligned hubs and wherein said second feedscrew is mounted between the hubs of said second pair of arms.

14. The feed apparatus of claim 12 further comprising means for controlling said rotating means as a function of the desired speed of driving means.

15. The feed apparatus of claim 12 further comprising pickoff means positioned at a downstream end of said first and second feedscrews for removing articles from said conveyor means one at a time.

16. The feed apparatus of claim 15 wherein said pickoff means comprises at least one suction cup operated so as to attach by suction to a substantially vertical surface of an article and then to remove said article from said conveyor means. consecutive protrusions of a helical thread on each f the two 17. A method for feeding flat articles comprising the steps of:

stacking the flat articles on and along a conveyor with the flat sides of the articles facing one another and with an edge of each article placed directly on the conveyor;

conveying the flat articles on the conveyor towards two feedscrews arranged parallel to each other and alongside the conveyor;

conveying the flat articles on the conveyor between the two feedscrews; and the two feedscrews rotating so as to separate the flat articles on the conveyor into groups, each group being supported between consecutive protrusions of a helical thread on each of the two feedscrews.

18. The method of claim 17 further comprising the step of picking off the flat articles from the conveyor one at a time at a downstream end of the feedscrews.

19. The method of claim 18 wherein said step of picking off comprises bringing at least one suction cup into suction contact with one of the flat sides of a flat article and moving the at least one suction cup away from the conveyor along with the flat article in suction contact with the at least one suction cup.

20. The method of claim 17 further comprising driving the conveyor at a desired speed and rotating the two feedscrews at a rate functionally related to the desired speed.

21. A feed apparatus comprising:

a linearly moving conveyor for moving articles placed thereon in a linear direction;

a first feedscrew mounted longitudinally in said linear direction alongside said conveyor and at least partially higher than said conveyor;

a second feedscrew mounted parallel to said first feedscrew proximate to said conveyor and mounted at a different vertical height from said conveyor than said first feedscrew, said first and second feedscrews both acting to support said articles in an upright position relative to said conveyor as said articles move on said conveyor; and adjustable arms attached to said first and second feedscrews so that said arms can reposition said feedscrews relative to said conveyor so that said feed apparatus can be used to convey articles of a different size.

22. The feed apparatus of claim 21 further comprising pickoff means positioned at a downstream end of said first and second feedscrews for removing articles from said conveyor one at a time.

23. The feed apparatus of claim 22 wherein said pickoff means comprises at least one suction cup operated so as to attach by suction to a substantially vertical surface of an article and then to remove said article from said conveyor.

24. The feed apparatus of claim 21 further comprising drive means for rotating said first and second feedscrews at equal speeds.

25. The feed apparatus of claim 24 further comprising motive means for driving said conveyor means at a linear speed and means for controlling said feedscrew drive means as a function of the linear speed of said conveyor means.

* * * * *

UNITED STATES PATENT AND TRADEMARK OFFICE
CERTIFICATE OF CORRECTION

PATENT NO. : 5,310,043
DATED : May 10, 1994
INVENTOR(S) : William J. Alcorn

It is certified that error appears in the above-indentified patent and that said Letters Patent is hereby corrected as shown below:

```
column 6, line 12    "on" should be --to--
column 7, line 36    "consecutive protrusions of a helical"
                     should be omitted
column 7, line 37    "thread on each f the two" should be
                     omitted
```

Signed and Sealed this

Fifteenth Day of November, 1994

Attest:

BRUCE LEHMAN

Attesting Officer

Commissioner of Patents and Trademarks